United States Patent
Rahul et al.

(10) Patent No.: US 12,452,432 B1
(45) Date of Patent: Oct. 21, 2025

(54) DETECTING QUALITY ISSUES IN ENCODED VIDEO

(71) Applicant: Amazon Technologies, Inc., Seattle, WA (US)

(72) Inventors: Kumar Rahul, Hyderabad (IN); Sriram Sethuraman, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 378 days.

(21) Appl. No.: 18/082,260

(22) Filed: Dec. 15, 2022

(51) Int. Cl.
*H04N 19/154* (2014.01)
*H04N 19/172* (2014.01)
*H04N 19/177* (2014.01)
*H04N 19/65* (2014.01)
*H04N 19/85* (2014.01)

(52) U.S. Cl.
CPC .......... *H04N 19/154* (2014.11); *H04N 19/172* (2014.11); *H04N 19/177* (2014.11); *H04N 19/65* (2014.11); *H04N 19/85* (2014.11)

(58) Field of Classification Search
CPC ...... H04N 19/85; H04N 19/65; H04N 19/177; H04N 19/172; H04N 19/154
See application file for complete search history.

(56) References Cited

U.S. PATENT DOCUMENTS

2016/0198166 A1* 7/2016 Kudana ................ H04N 19/159
375/240.15

\* cited by examiner

*Primary Examiner* — On S Mung
(74) *Attorney, Agent, or Firm* — Eversheds Sutherland (US) LLP

(57) ABSTRACT

Disclosed are various embodiments for detecting potential quality issues in encoded video content. Frame level metrics included in metric data that is associated with an encoded video can be analyzed and one or more quality scores can be calculated using the frame level metric values. If the quality scores meet or exceed one or more threshold values, an alarm notification can be generated that identifies a video segment that has a quality issue along with the one or more quality scores. The alarm notification can be sent to an entity for further evaluation of the encoded video.

19 Claims, 6 Drawing Sheets

DETECTING QUALITY ISSUES IN ENCODED VIDEO

BACKGROUND

A video signal is typically encoded by one or more video encoders in order to generate a video stream capable of being sent over a data communications network. Such encoding is useful to reduce the bitrate associated with the video signal, thereby allowing the video stream to fit within the bandwidth constraints of the network. Data reduction is also helpful in some systems to permit forward error correction data to be transmitted in the video stream. However, video encoders may be resource intensive, sometimes requiring significant processing and/or memory resources in order to achieve acceptable video quality.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to detecting potential quality issues in video content, such as movies, television programs, and the like, during the encoding process. With the growing scale of video content every day, it is difficult to keep track and analyze the encoded segments which have low quality. Traditionally, a deeper analysis of the video has occurred in response to customer complaints. In addition, the task of identifying a video sequence with lower video quality can be cumbersome and require manual viewing of whole content. In overcoming problems associated with the traditional methods of detecting quality issues in encoded video, the present disclosure provides an automatic alarm system integrated within the encoding process which can be triggered whenever a quality score calculated associated with the encoded video fails to meet or exceed a threshold value.

Figure 1:
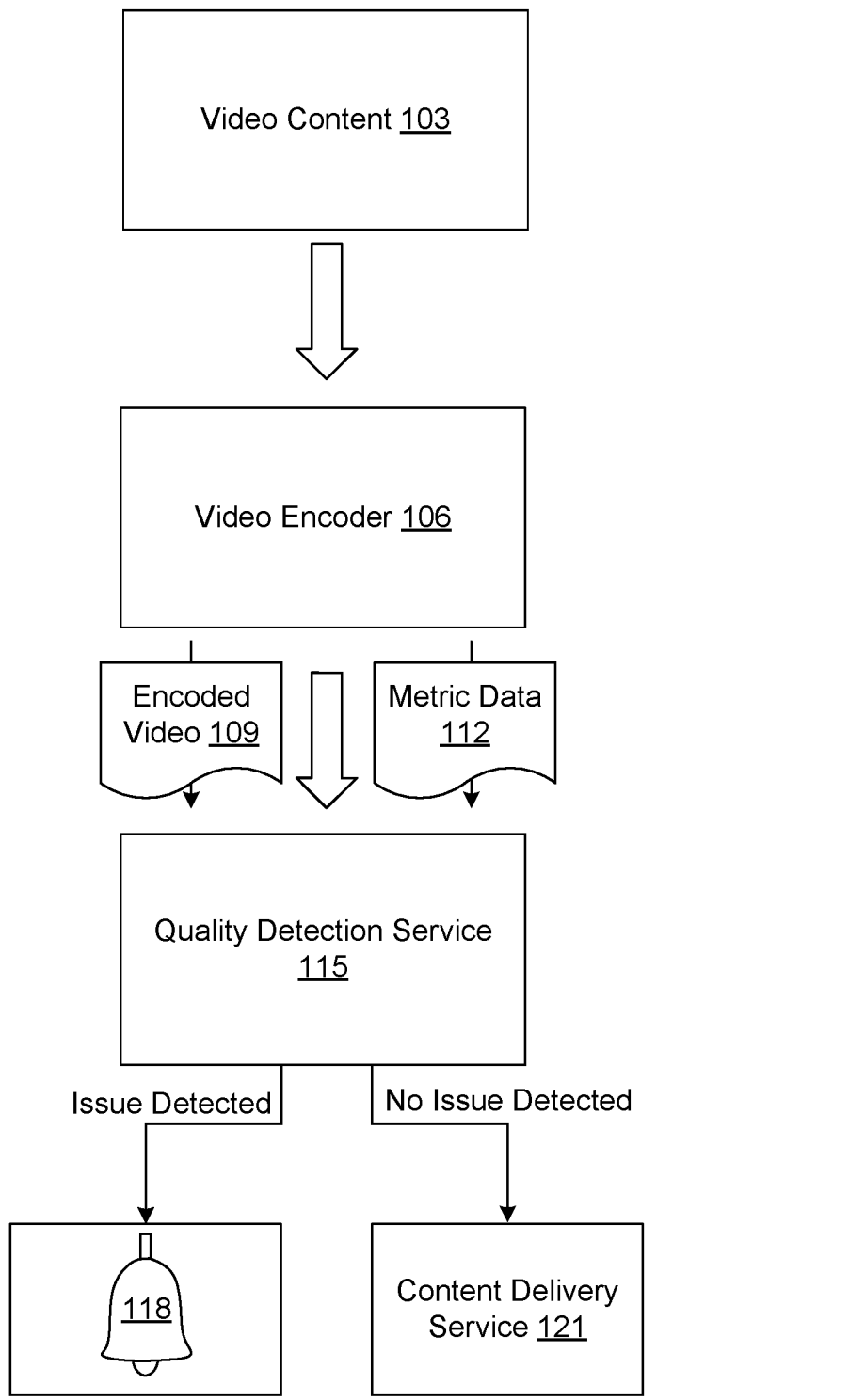
FIG. 1 is a drawing of an example scenario involving quality detection and alarm notification associated with encoded video content according to various embodiments of the present disclosure.

Turning now to FIG. 1, shown is an example scenario associated with an automated alarm system integrated within the encoding pipeline process. In particular, video content 103 (e.g., movies, television programs, live videos, recorded presentations, etc.) is typically encoded prior to transmission the video content 103 to another device over a network. In various examples, a video encoder 106 can receive the video content 103 as an input and convert and compress the video content 103 to generate encoded video 109 that is suitable for transmission over the network for user consumption. In various examples, the video encoder 106 may include various types of media encoders, such as, for example, Moving Pictures Experts Group (MPEG) encoders, H.265 encoders, H.264 encoders, Flash® media encoders, etc. Such media encoders may be selected according to factors such as, for example, data reduction, encoding quality, latency, etc.

In various examples, the video encoder 106 can generate metric data 112 along with the encoded video 109 that provides frame level metrics associated with the encoded video. For example, the frame level metrics can include one or more of a frame index number, a frame type, a quantization parameter value (e.g., degradation value), peak signal to noise ratio (PSNR) data (e.g., Y-PSNR, U-PSNR, V-PSNR, YUV-PSNR), structural similarity index measure (SSIM) value (e.g., SSIM dB), a luminance value (e.g., average Luma level), or one or more chroma component values (e.g., avg Cb level, avg. Cr level, etc.). In some examples, various parameters of the video encoder 106 may need to be enabled for different metrics to be included in the metric data 112. For example, when encoding with an HEVC/x265 encoder, the "CSV Log Level 2" parameter may need to be enabled such that the metric data 112 comprises frame level metrics for the encoded video 109. Similarly, the parameters for SSIM (e.g., "--ssim") and PSNR (e.g., "--psnr") may need to be enabled to ensure that the metrics associated with the SSIM and PSNR are obtained and included in the metric data 112. In various examples, the metric data 112 can be included in a log or other type of output at the completion of the video encoding by the video encoder 106. In other examples, the metric data 112 can correspond to data that is output in real-time or periodically, and received by the quality detection service 115 during the encoding of the video.

According to various examples, a quality detection service 115 can be executed to analyze the frame level metrics included in the metric data 112 and calculate quality scores based at least in part on the analysis of the frame level metrics. In various examples, one or more quality scores can be calculated for each video segment or group of pictures (GOP) based at least in part on the analysis of frame level metrics. In various examples, the quality scores for each segment can be compared to a threshold value. If a quality score meets or exceeds the threshold value, the segment can be flagged as having a potential quality issue. If a threshold number of segments are flagged as having the potential quality issue, an alarm notification 118 can be generated. The alarm notification can then be sent to the appropriate entity for further review along with an identification of the affected segments and their corresponding scores. If the number of flagged segments fail to meet or exceed the threshold, the encoded video is determined to have no detected issues and can be available for user consumption via the content delivery service 121. In examples, were the metric data 112 is provided during the encoding process, the quality detection service 115 can analyze the frame level metrics included in the metric data during the encoding process. As such, quality issues may be detected in video segments during the encoding process.

The automated alarm system of the present disclosure improves the overall efficiency in detecting and correcting quality issues. In the following discussion, a general description of the system and its components is provided, followed by a discussion of the operation of the same.

Figure 2:
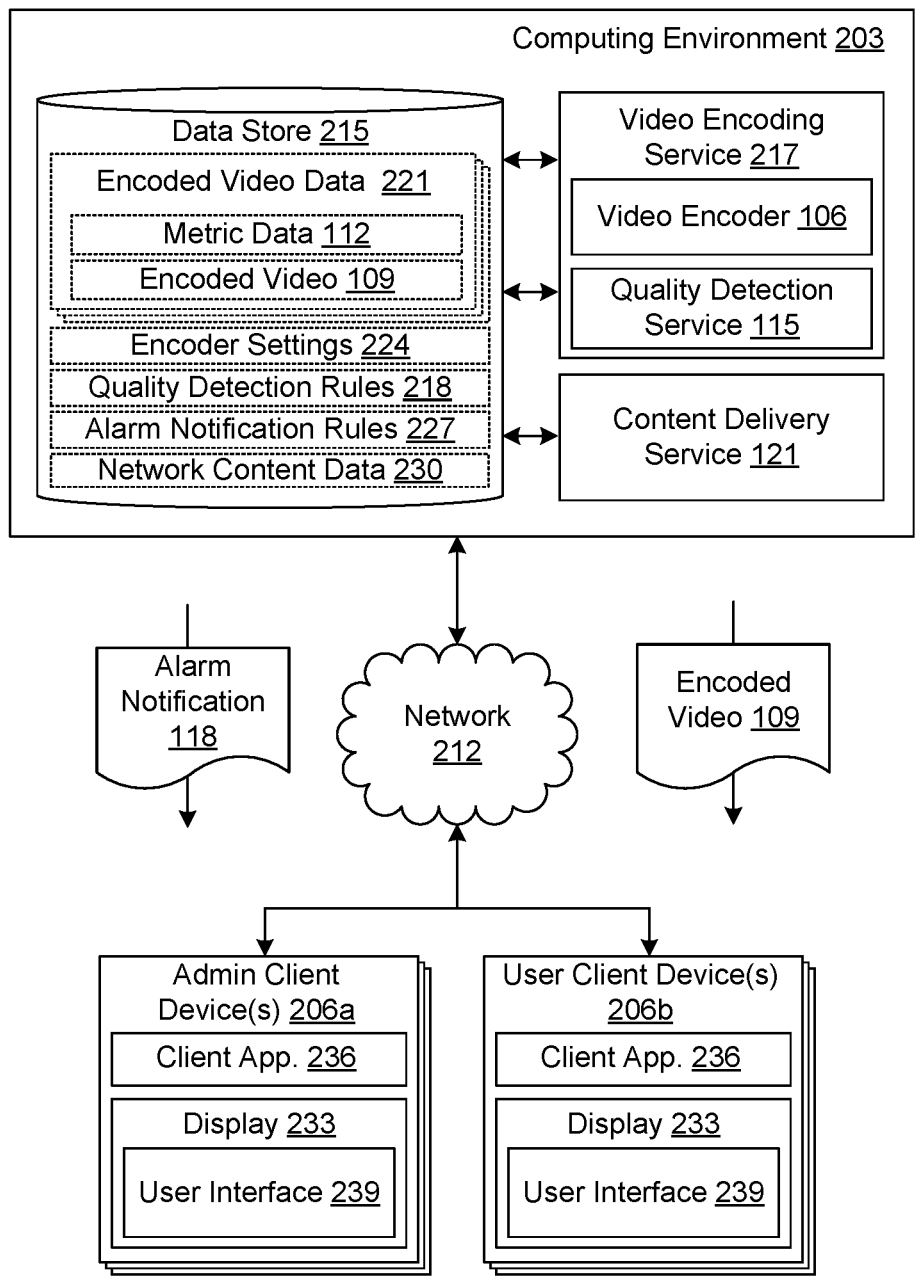
FIG. 2 is a schematic block diagram of a networked environment according to various embodiments of the present disclosure.

With reference to FIG. 2, shown is a networked environment 200 according to various embodiments. The networked environment 200 includes a computing environment 203, an administrator client device 206a, and a user client device 206b, which are in data communication with each other via a network 212 The network 209 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 209 can also include a combination of two or more networks 209. Examples of networks 209 can include the Internet, intranets, extranets, virtual private networks (VPNs), and similar networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 215 that is accessible to the computing environment 203. The data store 215 may be representative of a plurality of data stores 215 as can be appreciated. The data stored in the data store 215, for example, is associated with the operation of the various applications and/or functional entities described below.

The components executed on the computing environment 203, for example, include a video encoding service 217, a content delivery service 121, and other applications, services, processes, systems, engines, or functionality not discussed in detail herein.

The video encoding service 217 can be executed to facilitate the encoding pipeline process for encoding video content 103 that can be transmitted over the network 212 to client device 206 for consumption. In various examples, the video encoding service 217 can include a video encoder 106, a quality detection service 115, and/or other systems or services. The video encoder 106 can correspond to one or more the various types of video encoders 106 that may be employed in the computing device 206. Some video encoders 106 may correspond to specific formats, such as, for example, H.265, H.264, MPEG-4, MPEG-2, and/or other formats. The content delivery service 121 is executed to serve up or stream encoded video 109 to client devices 206 (e.g., the administrator client device 206a, the user client device 206b).

The quality detection service 115 is executed to analyze metric data 112 associated with encoded video 109 that is output from the video encoder 106 to detect potential quality issues with one or more video segments or group of pictures (GOPs) in the encoded video 109. In various examples, the quality detection service 115 can be executed to analyze the frame level metrics included in the metric data 112 and calculate quality scores based at least in part on the analysis of the frame level metrics. In various examples, the quality detection service 115 analyzes the metric data 112 during the encoding process. In other examples, the quality detection service 115 analyzes the metric data 115 upon completion of the encoding process. In various examples, one or more quality scores can be calculated for each video segment or group of pictures (GOP) based at least in part on the analysis of frame level metrics. In various examples, the quality scores for each segment can be compared to a threshold value that is included in the quality detection rules 218.

If a calculated quality score meets or exceeds the threshold value, the quality detection service 115 can flagged the segment as having a potential quality issue. If a threshold number of segments are flagged as having the potential quality issue, the quality detection service 115 generates an alarm notification 118. The alarm notification 118 can then be sent to the appropriate entity (e.g., administrator client device 206a) for further review along with an identification of the affected segments and their corresponding scores. If the number of flagged segments fail to meet or exceed the threshold, quality detection service 115 can determine that the encoded video 109 includes no quality issues of concern and can permit the encoded video 109 to be available for user consumption (e.g., streaming) via the content delivery service 121.

The data stored in the data store 215 includes, for example, encoded video data 221, encoder settings 224, quality detection rules 218, alarm notification rules 227, network content data 230, and potentially other data.

Figure 3:
FIG. 3 is a pictorial diagram of example metric data that is associated with encoded video content generated by a video encoder executed in a computing environment in the networked environment of FIG. 2 according to various embodiments of the present disclosure.

The encoded video data 221 comprises data associated with video content 103 that has been encoded using the video encoder 106. For example, the encoded video data 221 comprises the encoded video 109, the metric data 112, and/or other data. The metric data 112 provides frame level metrics associated with the encoded video. For example, the frame level metrics can include one or more of a frame index number, a frame type, a quantization parameter value (e.g., degradation value), peak signal to noise ratio (PSNR) data (e.g., Y-PSNR, U-PSNR, V-PSNR, YUV-PSNR), structural similarity index measure (SSIM) value (e.g., SSIM dB), a luminance value (e.g., average Luma level), or one or more chroma component values (e.g., avg Cb level, avg. Cr level, etc.). In various examples, the metric data 112 can comprise a log comprising delimited text file, a CSV (comma-separated values) file, and/or any other suitable file structure. In other examples, the metric data 112 can comprise a data stream of data associated with the frame level metrics. In this example, the metric data 112 can be provided to the quality detection service 115 in real-time or periodically by the video encoder 106 during the encoding process. FIG. 3 illustrates an example of metric data 112 as a log file that can be generated by the video encoder 106.

The encoder settings 224 comprise settings defining the operation and configuration of the video encoder 106. In various examples, the encoder settings 224 can be enabled and/or disabled based at least in part on configurations for encoding the video content 103. In some examples, various settings of the video encoder 106 may need to be enabled for different metrics to be included in the metric data 112. For example, when encoding with an HEVC/x265 encoder, the "CSV Log Level 2" parameter may need to be enabled such that the metric data 112 comprises frame level metrics for the encoded video 109. Similarly, the parameters for SSIM (e.g., "--ssim") and PSNR (e.g., "--psnr") may need to be enabled to ensure that the metrics associated with the SSIM and PSNR are obtained and included in the metric data 112. In various examples, the configuration settings can be user defined via user interactions with the video encoding service 217. For example, an administrator interacting with the video encoding service 217 via the client application 236 on the administrator client device 206 can configure the video encoder 106 as desired.

The quality detection rules 218 include rules, models, and/or configuration data for the various algorithms or approaches employed by the quality detection service 115. For example, the quality detection rules 218 can include the various models and/or algorithms for calculating a quality score for video segment (e.g., GOP). In addition, the quality detection rules 218 can include threshold values associated with determining if there is a potential quality issue and/or whether an alarm notification 118 needs to be generated.

The alarm notification rules 227 include rules, models, and/or configuration data for the various algorithms or approaches employed by the quality detection service 115. For example, the alarm notification rules 227 can include configuration data and/or rules for identifying the recipient of the alarm notification. In some examples, the alarm notification rules 227 comprise contact data (e.g., email address, phone number, etc.) associated with the recipient. In various examples, the alarm notification rules 227 can include format data to define how the notification is to be generated and what information (e.g., segment number, segment quality score, etc.) to include in the notification.

The network content data 230 includes may include various data employed by the quality detection service 115 and/or content delivery service 121 in generating user interfaces and/or other network pages. The network content data 230 may include hypertext markup language (HTML), extensible markup language (XML), cascading style sheets (CSS), images, text, audio, video, templates, and/or other data.

The client device 206 (e.g., administrator client device 206a, user client device 206b) is representative of a plurality of client devices that may be coupled to the network 212. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 206 may include a display 233. The display 233 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a client application 236 and/or other applications. The client application 236 may be executed in a client device 206, for example, to access network content served up by the computing environment 203 and/or other servers, thereby rendering a user interface 239 on the display 233. To this end, the client application 236 may comprise, for example, a browser, a dedicated application, etc., and the user interface 239 may comprise a network page, an application screen, etc. The client device 206 may be configured to execute applications beyond the client application 236 such as, for example, email applications, social networking applications, word processors, spreadsheets, and/or other applications.

Next, a general description of the operation of the various components of the networked environment 200 is provided. To begin, video content 103 (FIG. 1) typically needs to be encoded prior to transmitting to client devices 206 for consumption. Accordingly, when video content 103 needs to be encoded, the video content 103 can be encoded using the video encoder 106 (FIG. 1).

According to various embodiments of the present disclosure, the video encoder 106 can be configured such that metric data 112 (FIG. 1) is included in the output of the video encoder 106 and includes the frame-level metrics needed for analysis to detect potential quality issues. For example, when encoding with an HEVC/x265 encoder, the "CSV Log Level 2" parameter should be enabled such that the metric data 112 comprises frame level metrics for the encoded video 109. Similarly, the parameters for SSIM (e.g., "--ssim") and PSNR (e.g., "--psnr") should be enabled to ensure that the metrics associated with the SSIM and PSNR are obtained and included in the metric data 112. In various examples, an administrator or other entity can enable the appropriate settings to configure the video encoder 109 via interactions with a client application 236 (FIG. 2) that is in communication with the video encoder service 217 or other application in the computing environment 203 (FIG. 2).

Once the video encoder 106 begins and/or completes the encoding process to encode the video content 103 to generate the encoded video 109, the quality detection service 115 can determine whether there are any potential quality issues with the encoded video 109. For example, quality issues can occur when the video encoder 106 runs out of bits during the encoding of the video content 103. In this example, when the internal bit control experiences issues, the quantization parameter of the video encoder 106 can be increased significantly compared to average levels, thereby resulting in quality issues in the encoded video 109.

According to various embodiments, the quality detection service 115 can analyze the metric data 112 associated with the encoded video 109 to determine if there are any potential quality issues in the encoded video 109. In particular, the quality detection service 115 can obtain the metric data 112 associated with the encoded video 109 and extract and analyze the corresponding metric features for the video frames of the encoded video 109. In various examples, the quality detection service 115 determines potential quality issues based at least in part on an analysis of each group of pictures (GOP) of the encoded video 109. In various examples, the quality detection service 115 identifies a GOP based at least in part on the frame index for each I-Frame included in the metric data 112. In various examples, a GOP can correspond to a video segment of the encoded video.

For each GOP, the quality detection service 115 calculates the average for each frame level metric (e.g., a quantization parameter value, PSNR data, SSIM value, avg. Luma level, avg Cb level, avg. Cr level, etc.) across a set of sliding windows comprising a subset of consecutive P frames within the GOP. In various examples, the set of sliding windows comprise consecutive and overlapping P frames. For example, if there are nine P frames in a given GOP and a given subset of consecutive P frames includes three P-frames, there will be multiple averages calculated for each of the frame-level metrics (e.g., averages for P frames 1-3, averages for P frames 2-4, averages for P frames 3-5, . . . averages for P frames 7-9). Upon calculating the respective averages for each of the different metrics for each of the different subsets of P frames, the quality detection service 115 identifies the maximum values from the averages for a first subset of metrics (e.g., a quantization parameter value, avg Cb level, avg. Cr level, avg. luma level) across the set of sliding windows within the GOP, and the minimum values from the averages for a second subset of metrics (e.g., PSNR data, SSIM value) across the set of sliding windows within the GOP.

Upon identifying the maximum values for the first subset of metrics and the minimum values for the second subset of metrics for a given sliding window, the quality detection service 115 calculates feature ratios associated with the metrics. For example, the quality detection service 115 can calculate a log_luma_ratio and an avg_SSIM_ratio as follows:

GOP[QP_log_luma_ratio]=GOP's[max_QP]/GOP's (log(avg_lum,base 2))

GOP[QP_Avg_SSIM_ratio]=GOP's['max_QP']/ GOP's[SSIMdB']

In some examples, the quality detection service 115 can select a subset of GOPs using threshold values (e.g., X, Y) that are tuned according to resolution parameters. For example, the GOPs can be selected when:

max_QP_threshold>X OR GOP_SSIMdB_threshold>Y

In various examples, the quality detection service 115 can flag a given GOP when the corresponding feature ratios exceed a threshold value (e.g., M, N) that is based on resolution. For example, if the following is meet for a given GOP, the quality detection service 115 may flag a given GOP index when:

QP_log_luma_ratio>M OR QP_Avg_SSIM_ratio>N

Once all of the GOP scores have been calculated and the corresponding feature ratios have been compared to a respective threshold value, the quality detection service 115 can determine the number of flagged GOPs for the encoded video 109. If the number of GOPs flagged exceeds a minimum threshold value for the corresponding resolution, the quality detection service 115 can generate an alarm notification 118 and transmit the alarm notification 118 to an administrator client device 106a or other appropriate entity for further evaluation. In various examples, the alarm notification 118 includes an identification of the flagged GOPs, the calculated score(s) (e.g., QP_log_luma_ratio, QP_Avg_SSIM_ratio), and/or other information for further review and treatment. If the number of GOPs flagged fail to exceed the minimum threshold value, the encoded video 109 can be determined to be available for transmission to user client devices 206b for consumption via the content delivery service 121.

Referring next to FIG. 3, shown is a pictorial diagram of an example portion of a log including metric data 112 that is associated with encoded video 109 generated by the video encoder 106 according to various embodiments of the present disclosure. The example portion of the metric data 112 includes frame level metrics that include a frame index number, a frame type, a quantization parameter value (e.g., degradation value), peak signal to noise ratio (PSNR) data (e.g., Y-PSNR, U-PSNR, V-PSNR, YUV-PSNR), structural similarity index measure (SSIM) value (e.g., SSIM dB), a luminance value (e.g., average Luma level), or one or more chroma component values (e.g., avg Cb level, avg. Cr level, etc.). According to various examples one or more of the frame level metrics can be extracted and analyzed to identify potential quality issues in encoded video 109.

Figure 4:
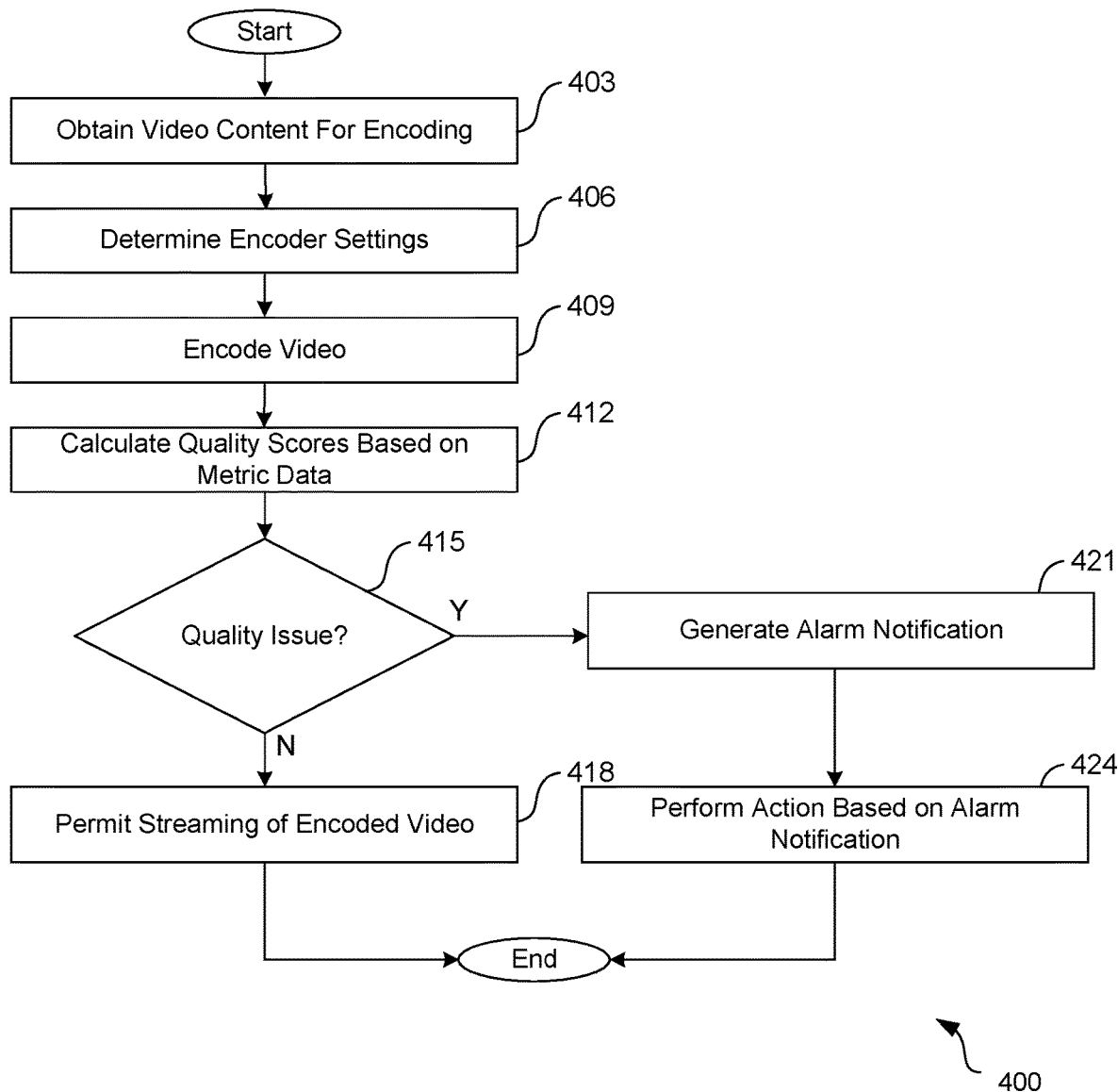
FIGS. 4 and 5 are flowchart illustrating one example of functionality implemented as portions of a video encoding service executed in a computing environment in the networked environment of FIG. 2 according to various embodiments of the present disclosure.

Referring next to FIG. 4, shown is a flowchart that provides one example of the operation of a portion of the video encoding service 217 according to various embodiments. It is understood that the flowchart of FIG. 4 provides merely an example of the many different types of functional arrangements that may be employed to implement the operation of the portion of the video encoding service 217 as described herein. As an alternative, the flowchart of FIG. 4 may be viewed as depicting an example of elements of a method implemented in the computing environment 203 (FIG. 2) according to one or more embodiments.

Beginning with box 403, the video encoding service 217 can obtain video content 103 for encoding. In various examples, the video content 103 (e.g., movies, television programs, live videos, recorded presentations, etc.) from the data store 215, a third-party entity, and/or other video source.

At box 406, the video encoding service 217 determines the encoder settings 224 that define the configuration of the video encoder 106. In various examples, the encoder settings 224 can be enabled and/or disabled based at least in part on configurations for encoding the video content 103. In some examples, various settings of the video encoder 106 may need to be enabled for different metrics to be included in the metric data 112. For example, when encoding with an HEVC/x265 encoder, the "CSV Log Level 2" parameter may need to be enabled such that the metric data 112 is output as a log that comprise frame level metrics for the encoded video 109. Similarly, the parameters for SSIM (e.g., "--ssim") and PSNR (e.g., "--psnr") may need to be enabled to ensure that the metrics associated with the SSIM and PSNR are obtained and included in the metric data 112. In various examples, the configuration settings can be user defined via user interactions with the video encoding service 217. For example, an administrator interacting with the video encoding service 217 via the client application 236 on the administrator client device 206 can configure the video encoder 106 as desired.

At box 409, the video encoder 106 of the video encoding service 217 encodes the video content 103 according to configuration defined by the encoder settings 224. The output of the video encoder 106 can comprise the encoded video 109, metric data 112 including frame level metrics, and/or other information. In various examples, the video encoder 106 can generate metric data 112 along with the encoded video 109 that provides frame level metrics associated with the encoded video. For example, the frame level metrics can include one or more of a frame index number, a frame type, a quantization parameter value (e.g., degradation value), peak signal to noise ratio (PSNR) data (e.g., Y-PSNR, U-PSNR, V-PSNR, YUV-PSNR), structural similarity index measure (SSIM) value (e.g., SSIM dB), a luminance value (e.g., average Luma level), or one or more chroma component values (e.g., avg Cb level, avg. Cr level, etc.).

At box 412, the quality detection service 115 of the video encoding service 217 calculates one or more quality scores based at least in part on an analysis of the frame level metrics included in the metric data 112 associated with the encoded video 109. In various examples, one or more quality scores can be calculated for each video segment or group of pictures (GOP) based at least in part on the analysis of frame level metrics. For example, the quality detection service 115 can calculate the average for each frame level metric (e.g., a quantization parameter value, PSNR data, SSIM value, avg. Luma level, avg Cb level, avg. Cr level, etc.) across the set of sliding windows within the GOP using the metric values for a subset of consecutive and overlapping P frames. Upon calculating the respective averages for each of the different metrics for each of the different subsets of P frames in a given GOP or video segment, the quality detection service 115 identifies the maximum values in the averages for a first subset of metrics (e.g., a quantization parameter value, avg Cb level, avg. Cr level, avg. luma level) and the minimum values in the averages for a second subset of metrics (e.g., PSNR data, SSIM value).

Upon identifying the maximum values and the minimum values, the quality detection service 115 can calculate feature ratios (e.g., quality scores) associated with the metrics. For example, the quality detection service 115 can calculate a log_luma_ratio, an avg_SSIM_ratio, and/or other feature ratios. In various examples, the quality detection service 115 can flag a given GOP when the corresponding feature ratios (e.g., quality scores) exceed a threshold value (e.g., M, N) that is based on resolution.

At box 415, the quality detection service 115 of the video encoding service 217 determines whether there is a quality issue for the encoded video 109. For example, the quality detection service 115 determines if there is a quality issue based at least in part on whether the calculated quality scores meet or exceed a predefined threshold. In some examples, the quality issue can be determined based at least in part on a number of segments (GOPs) in an encoded video 109 that have been flagged. For example, if the number of flagged segments meet or exceed a given threshold, the quality detection service 115 can determine that there is a quality issue with the encoded video 109. If there is not a quality issue, the quality detection service 115 proceeds to box 418, and permits transmission or streaming of the encoded video 109 to client devices 206 for user consumption. Thereafter, the process proceeds to completion.

However, if the quality detection service 115 of the video encoding service 217 detects a quality issue, the quality detection service 115 proceeds to box 421. At box 421, the quality detection service 115 generates an alarm notification 118. In various examples, the alarm notification 118 includes an identification of the flagged GOPs, the calculated score(s) (e.g., QP_log_luma_ratio, QP_Avg_SSIM_ratio), and/or other information for further review and treatment.

At box 424, the quality detection service 115 of the video encoding service 217 performs an action. For example, the quality detection service 115 may transmit the alarm notification 118 to an administrator client device 106a or other appropriate entity for further evaluation. In some examples, the action may comprise suspending streaming and/or stopping the publishing of the encoded video 109 for streaming until the encoded video has been evaluated and the detected issue resolved. For example, the encoded video 109 may be flagged with an indicator that keeps the encoded video 109 from being published and/or available for streaming by end users via the content delivery service 121. Thereafter, this portion of the process proceeds to completion.

Figure 5:
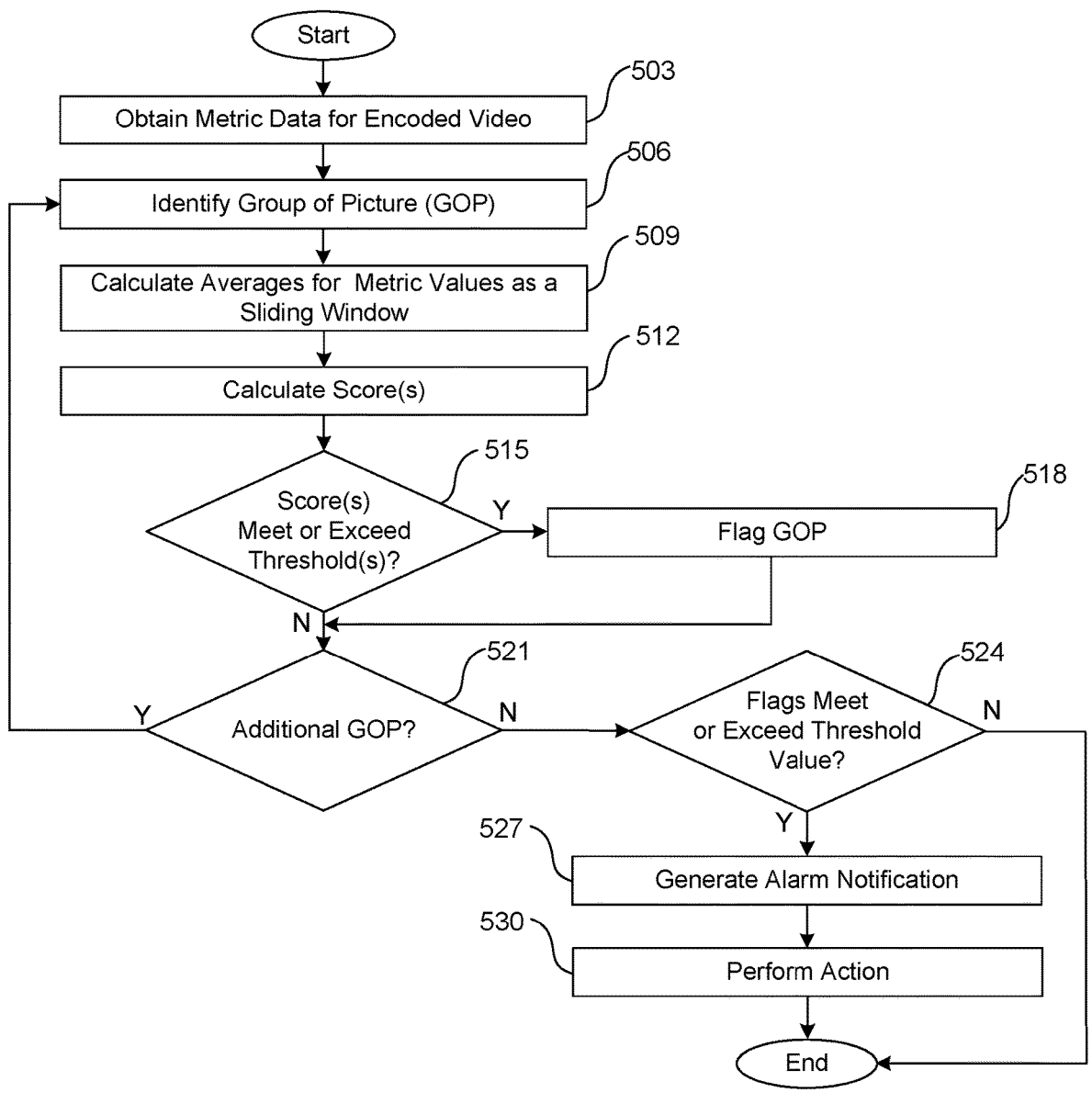

Referring next to FIG. 5, shown is a flowchart that provides one example of the operation of a portion of the quality detection service 115 according to various embodiments. It is understood that the flowchart of FIG. 5 provides merely an example of the many different types of functional arrangements that may be employed to implement the operation of the portion of the quality detection service 115 as described herein. As an alternative, the flowchart of FIG. 5 may be viewed as depicting an example of elements of a method implemented in the computing environment 203 (FIG. 2) according to one or more embodiments.

Beginning with box 503, the quality detection service 115 obtains metric data 112 associated with an encoded video 109. The metric data 112 can be obtained from the data store 215 with respect to the encoded video data 221 that is output from the video encoder 106 following the generation of the encoded video 109 from the video content 103 by the video encoder 106.

At box 506, the quality detection service 115 identifies a group of pictures (GOP) for the encoded video 109. In various examples, the quality detection service 115 identifies a GOP based at least in part on the frame index for each I-Frame included in the metric data 112. In various examples, a GOP can correspond to a video segment of the encoded video.

At box 509, the quality detection service 115 analyzes the frame level metrics included in the metric log 109 and generates averages for the metric values across a set of sliding windows within the GOP. For example, the quality detection service 115 can identify a subset of consecutive frames in the GOP. In various examples, the subset of frames include a subset of consecutive P-frames included in the GOP. For example, the number and types of frames included in the subset can be defined by the quality detection rules 218. For example, the number of frames in a given subset can include three consecutive frames. Accordingly, the first subset of frames identified may include the first three consecutive P-frames included in the GOP and the second subset of frames may include the next three consecutive P-frames. The P-frames can be identified by the frame level metric values in the metric data 112.

Upon identifying the frame level metric values in the metric data 115, the quality detection service 115 determines an average for each of the metric values. For example, the metric values included in the metric data 112 can include a quantization parameter value, PSNR data, SSIM value, avg. Luma level, avg Cb level, avg. Cr level, and/or other metric value. The quality detection service 115 can identify a metric based on a position within the metric data 112, a predefined order to evaluate the metrics, and/or other factors. The quality detection service 115 will evaluate or otherwise calculate the average for each of the frame-level metrics for the subset of consecutive frames as a sliding window for the whole GOP. For example, the quality detection service 115 will calculate an average for each of the metric values for the first subset of consecutive frames, another average for each of the metric values for the next subset of consecutive frames, and so on. For example, if there are nine P frames in a given GOP and a given subset of consecutive P frames includes three P-frames, there will be multiple averages calculated for each of the frame-level metrics (e.g., averages for P frames 1-3, averages for P frames 2-4, averages for P frames 3-5, ... averages for P frames 7-9). As such, there will be multiple averages calculated for each of the metrics across the set of sliding windows within the GOP.

At box 512, the quality detection service 115 calculates one or more quality scores for the GOP. In various examples, the quality detection service 115 will extract a maximum value and/or a minimum value from the plurality of averages calculated for the given metric for across the set of sliding windows within the GOP. In some examples, the selection of the value will be based at least in part on the type of metric. For example, the quality detection service 115 extracts the maximum value for metrics included in a first group of metrics (e.g., a quantization parameter value, avg Cb level, avg. Cr level, avg. luma level) and the minimum value for metrics included in a second group of metrics (e.g., PSNR data, SSIM value). In various examples, the quality detection service 115 calculates one or more quality scores based at least in part on the extracted minimum and maximum values across the set of sliding windows within the GOP. In various examples, quality scores can correspond to feature ratios associated with the metrics. For example, the quality detection service 115 can calculate a log_luma_ratio and an avg_SSIM_ratio using the selected minimum and maximum values for the metrics.

At box 515, the quality detection service 115 determines whether the scores meet or exceed a threshold value. In various examples, the threshold values can be determined and tuned according to resolution parameters. If the quality detection service 115 determines that one or more of the calculated scores meets or exceeds the predefined threshold, the quality detection service 115 proceeds to box 518, where the GOP is flagged as having a potential quality issue. Otherwise, the quality detection service 115 proceeds to box 521.

At box 521, the quality detection service 115 determines whether there are additional GOPs included in the encoded video 109 that require evaluation. If there are additional GOPs, the quality detection service 114 returns to box 506. Otherwise, the quality detection service 115 proceeds to box 524.

At box 524, the quality detection service 115 determines whether the number of flagged GOPs meet or exceed the threshold value. If the number of flagged GOPs meet or exceed the threshold value, the quality detection service 115 proceeds to box 527. Otherwise, this portion of the process proceeds to completion.

At box 527, the quality detection service 115 generates an alarm notification 118. In various examples, the alarm notification 118 includes an identification of the flagged GOPs, the calculated score(s) (e.g., QP_log_luma_ratio, QP_Avg_SSIM_ratio), and/or other information for further review and treatment.

At box 530, the quality detection service 115 performs an action. For example, the quality detection service 115 may transmit the alarm notification 118 to an administrator client device 106a or other appropriate entity for further evaluation. In some examples, the action may comprise suspending streaming and/or stopping the publishing of the encoded video 109 for streaming until the encoded video has been evaluated and the detected issue resolved. For example, the encoded video 109 may be flagged with an indicator that keeps the encoded video 109 from being published and/or available for streaming by end users via the content delivery service 121. Thereafter, this portion of the process proceeds to completion.

Figure 6:
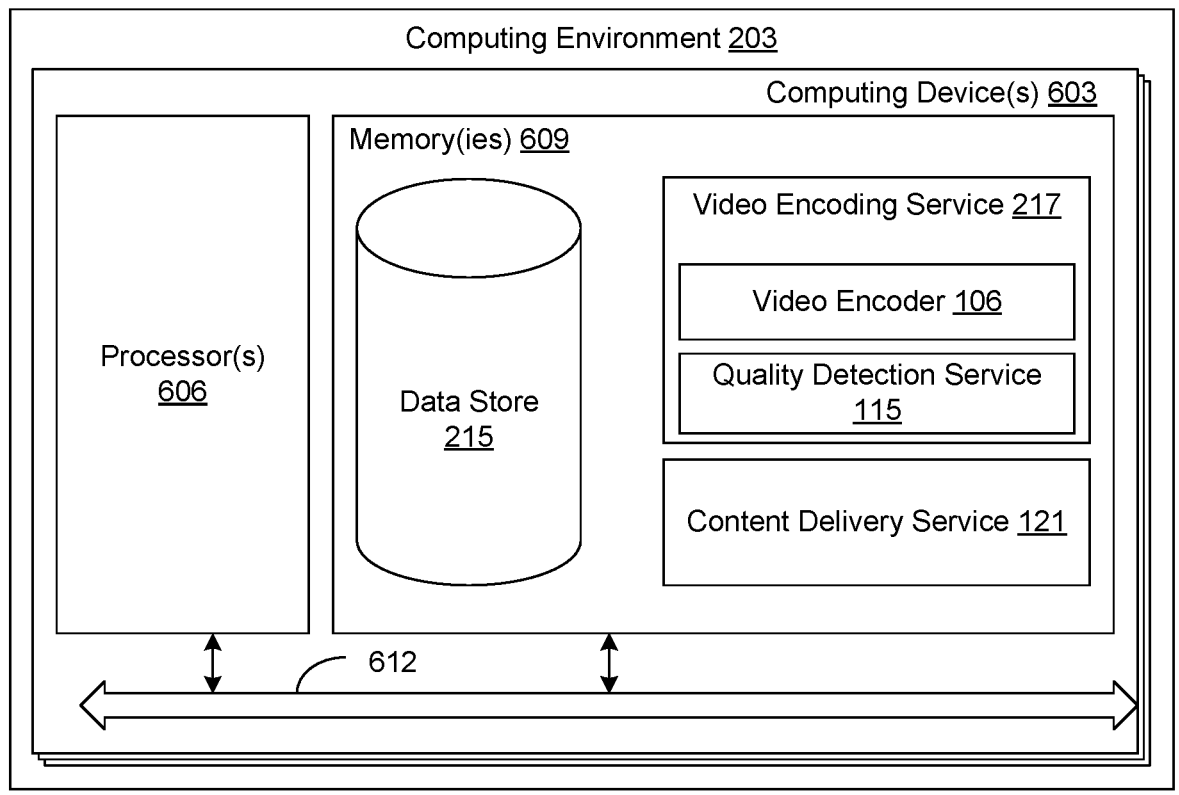
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 603. Each computing device 603 includes at least one processor circuit, for example, having a processor 606 and a memory 609, both of which are coupled to a local interface 612. To this end, each computing device 603 may comprise, for example, at least one server computer or like device. The local interface 612 may comprise, for example, a data bus with an accompanying address/control bus or other bus structure as can be appreciated.

Stored in the memory 609 are both data and several components that are executable by the processor 606. In particular, stored in the memory 609 and executable by the processor 606 are the video encoding service 217, the content delivery service 121, and potentially other applications. Also stored in the memory 609 may be a data store 215 and other data. In addition, an operating system may be stored in the memory 609 and executable by the processor 606.

It is understood that there may be other applications that are stored in the memory 609 and are executable by the processor 606 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 609 and are executable by the processor 606. In this respect, the term "executable" means a program file that is in a form that can ultimately be run by the processor 606. Examples of executable programs may be, for example, a compiled program that can be translated into machine code in a format that can be loaded into a random access portion of the memory 609 and run by the processor 606, source code that may be expressed in proper format such as object code that is capable of being loaded into a random access portion of the memory 609 and executed by the processor 606, or source code that may be interpreted by another executable program to generate instructions in a random access portion of the memory 609 to be executed by the processor 606, etc. An executable program may be stored in any portion or component of the memory 609 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 609 is defined herein as including both volatile and nonvolatile memory and data storage components. Volatile components are those that do not retain data values upon loss of power. Nonvolatile components are those that retain data upon a loss of power. Thus, the memory 609 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 606 may represent multiple processors 606 and/or multiple processor cores and the memory 609 may represent multiple memories 609 that operate in parallel processing circuits, respectively. In such a case, the local interface 612 may be an appropriate network that facilitates communication between any two of the multiple processors 606, between any processor 606 and any of the memories 609, or between any two of the memories 609, etc. The local interface 612 may comprise additional systems designed to coordinate this communication, including, for example, performing load balancing. The processor 606 may be of electrical or of some other available construction.

Although the video encoding service 217, the content delivery service 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4 and 5 show the functionality and operation of an implementation of portions of the video encoding service 217. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 606 in a computer system or other system. The machine code may be converted from the source code, etc. If embodied in hardware, each block may represent a circuit or a number of interconnected circuits to implement the specified logical function(s).

Although the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the video encoding service 217 and the content delivery service 121, that comprises software or code can be embodied in any non-transitory computer-readable medium for use by or in connection with an instruction execution system such as, for example, a processor 606 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the video encoding service 217 and the content delivery service 121, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 603, or in multiple computing devices 603 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    at least one computing device; and
    at least one application executable by the at least one computing device, wherein, when executed, the at least one application causes the at least one computing device to at least:
        encode video content to generate an encoded video comprising a plurality of video segments;
        obtain metric data associated with the encoded video, the metric data providing a plurality of frame level metrics associated with the plurality of video segments of the encoded video;
        calculate a respective video segment quality score for individual video segments of the plurality of video segments based at least in part on the plurality of frame level metrics included in the metric data;
        determine a number of video segments where the respective video segment quality score fails to meet or exceed a first threshold value;

generate an alarm notification in response to the number of video segments meeting or exceeding a second threshold value, the alarm notification identifying the individual video segments of the plurality of video segments where the respective video segment quality score fails to meet or exceed the first threshold value, respective segment index, and the respective video segment quality score of the individual segments; and cause an action to be performed based at least in part on the alarm notification.

2. The system of claim 1, wherein the plurality of frame level metrics comprise at least one of a frame index number, a frame type, a quantization parameter value, peak signal to noise ratio (PSNR) data, a structural similarity index measure (SSIM) value, a luminance value, or one or more chroma component values.

3. The system of claim 1, wherein, when executed, the at least one computing application further causes the at least one computing device to at least:

for a respective metric of the plurality of frame level metrics,
calculate a plurality of averages using a sliding window associated with a subset of frames in a respective video segment of the plurality of video segments;
the respective video segment quality score for the respective video segment being calculated based at least in part on the plurality of averages.

4. The system of claim 1, wherein, when executed, the at least one computing application further causes the at least one computing device to at least prior to encoding the video content, update a first encode setting to enable peak signal to noise ratio (PSNR) and a second encode setting to enable structural similarity index measure (SSIM) such that the metric data includes PSNR data and SSIM values.

5. A method, comprising:
analyzing, via at least one computing device, metric data associated with an encoded video, the metric data comprising a plurality of frame level metrics for the encoded video;
generating, via the at least one computing device, a quality score for a group of pictures (GOP) of the encoded video based at least in part on an analysis of the plurality of frame level metrics for individual frames of a plurality of frames included in the GOP;
determining, via the at least one computing device, a quality issue within the GOP of the encoded video by comparing the quality score with a threshold value;
generating, via the at least one computing device, an alarm notification indicating a detection of the quality issue for the GOP when the quality score meets or exceeds the threshold value, the alarm notification further comprising the quality score of the GOP; and
performing, via the at least one computing device, an action based at least in part on the alarm notification.

6. The method of claim 5, wherein the plurality of frame level metrics comprise at least one of a frame index number, a frame type, a quantization parameter value, peak signal to noise ratio (PSNR) data, a structural similarity index measure (SSIM) value, a luminance value, or one or more chroma component values.

7. The method of claim 5, further comprising:
identifying a plurality of frames included in the GOP;
generating a plurality of averages for a given metric using a sliding window associated with metric values of the given metric for a predefined number of consecutive frames of the plurality of frames; and
selecting a value from the plurality of averages based at least in part on a type of metric,
the quality score being based at least in part on the selected value.

8. The method of claim 7, wherein a minimum value is selected from the plurality of averages when the type of metric of the given metric comprises one of peak signal to noise ratio (PSNR) data or a structural similarity index measure (SSIM) value, and a maximum value is selected from the plurality of averages when the type of metric of the given metric comprises one of a quantization parameter, a luminance value, or one or more chroma component values.

9. The method of claim 5, wherein the plurality of frames comprise a plurality of P-frames included in the GOP.

10. The method of claim 5, wherein the GOP comprises a plurality of GOPs in the encoded video, and the quality score comprises a first quality score of a plurality of quality scores, a respective quality score being calculated for individual GOPs in the encoded video.

11. The method of claim 10, further comprising:
determining a number of GOPs where the respective quality score meets or exceeds a first threshold value; and
determining that the number of GOPs meets or exceeds a second threshold value, the quality issue being determined in response to the number of GOPs meeting or exceeding a second threshold value.

12. The method of claim 5, further comprising:
enabling one or more encode parameters for an encoder, the one or more encode parameters comprising at least one of PSNR or SSIM; and
encoding video content using the encoder to generate the encoded video content.

13. A system, comprising:
at least one computing device; and
at least one computing application executable in the at least one computing device, wherein when executed the at least one computing application causes the at least one computing device to at least:
calculate a plurality of quality scores for a plurality of video segments of encoded video content, the plurality of quality scores being based at least in part on a plurality of frame level metrics associated with the encoded video;
determine a number of video segments with a respective quality score of the plurality of quality scores meeting or exceeding a first threshold value;
generating an alarm notification when the number of video segments meets or exceeds a second threshold value; and
cause an action to be performed based at least in part on the alarm notification.

14. The system of claim 13, wherein the alarm notification includes the respective quality score and an identification of individual video segments of the plurality of video segments where the respective quality score meets or exceeds the first threshold value.

15. The system of claim 13, wherein the plurality of frame level metrics are included in metric data that is output from an encoder, the plurality of frame level metrics corresponding to individual frames of a plurality of frames of a respective video segment of the plurality of video segments.

16. The system of claim 15, wherein the plurality of frames comprise P-frames of the respective video segment.

17. The system of claim 13, wherein the plurality of frame level metrics comprise one or more of a quantization parameter value, peak signal to noise ratio (PSNR) data, a structural similarity index measure (SSIM) value, a luminance value, or one or more chroma component values.

18. The system of claim 13, wherein, when executed, the at least one application causes the at least one computing device to at least generate the encoded video content using an encoder, the plurality of frame level metrics being included in metric data that is created by the encoder.

19. The system of claim 13, wherein the respective score is calculated based at least in part on a sliding window of averages associated with the frame level metrics.

* * * * *